United States Patent
Majima

(10) Patent No.: US 12,248,292 B2
(45) Date of Patent: Mar. 11, 2025

(54) CONTROLLER AND CONTROLLER SYSTEM CONTROLLING TIME AND COST TO DUPLICATE A CONTROLLER

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventor: Michiaki Majima, Fuchu (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 366 days.

(21) Appl. No.: 17/783,535

(22) PCT Filed: Jun. 8, 2021

(86) PCT No.: PCT/JP2021/021679
§ 371 (c)(1),
(2) Date: Jun. 8, 2022

(87) PCT Pub. No.: WO2022/059269
PCT Pub. Date: Mar. 24, 2022

(65) Prior Publication Data
US 2023/0008667 A1    Jan. 12, 2023

(30) Foreign Application Priority Data
Sep. 16, 2020   (JP) .................................. 2020-155659

(51) Int. Cl.
G05B 19/05    (2006.01)

(52) U.S. Cl.
CPC ......... G05B 19/052 (2013.01); G05B 19/054 (2013.01); G05B 19/058 (2013.01)

(58) Field of Classification Search
CPC .. G05B 19/052; G05B 19/054; G05B 19/058; G05B 2219/14132; G05B 2219/24186;
(Continued)

(56) References Cited

U.S. PATENT DOCUMENTS 7,023,795 B1 * 4/2006 Hwu ..................... H04L 49/552
370/219
2003/0225813 A1 * 12/2003 Nagano ............... G06F 11/2005
718/102
(Continued)

FOREIGN PATENT DOCUMENTS

JP    10-222204 A    8/1998
JP    2002026932 A    1/2002
(Continued)

OTHER PUBLICATIONS

International Search Report issued Aug. 10, 2021 in PCT/JP2021/021679, filed on Jun. 8, 2021, 7 pages (with English Translation).
(Continued)

Primary Examiner — Alicia M. Choi
(74) Attorney, Agent, or Firm — Maier & Maier, PLLC

(57) ABSTRACT

A controller includes: a communication port and a connection port that allow communication with another controller; and a hardware processor coupled to the ports. The hardware processor is configured to: transmit a first state signal indicating a state of the controller of an own device to the other controller from each port; receive a second state signal indicating a state of the other controller from the other controller via each of the ports; and switch, when the own device is in a standby state, the own device from the standby state to an operating state, when a breakdown of the other
(Continued)

controller indicated by the received second state signal and an unreceived state in which the second state signal is not received for a predetermined time or more from both the communication and connection ports are monitored and at least one of the breakdown and the unreceived state is detected.

2 Claims, 6 Drawing Sheets

(58) Field of Classification Search
CPC ....... G05B 19/0428; G05B 9/03; H04L 12/12; G06F 11/2005; G06F 1/3209
See application file for complete search history.

(56) References Cited

U.S. PATENT DOCUMENTS

| | | | |
|---|---|---|---|
| 2007/0147232 A1* | 6/2007 | Takehara | G05B 9/02 370/242 |
| 2008/0205406 A1 | 8/2008 | Hatakeyama | |
| 2009/0077270 A1* | 3/2009 | Chen | G05B 19/0428 710/2 |
| 2010/0265817 A1 | 10/2010 | Kuwata et al. | |
| 2015/0263970 A1* | 9/2015 | Macchiano | H04L 49/70 709/223 |
| 2016/0036626 A1* | 2/2016 | Bale | H04L 41/0663 370/242 |
| 2018/0011482 A1* | 1/2018 | Ko | G05B 23/0267 |
| 2018/0123872 A1 | 5/2018 | Zhang | |

FOREIGN PATENT DOCUMENTS

| | | |
|---|---|---|
| JP | 2002026956 A | 1/2002 |
| JP | 2003-015702 A | 1/2003 |
| JP | 2005-267236 A | 9/2005 |
| JP | 2008-181240 A | 8/2008 |
| JP | 2008-21 1682 A | 9/2008 |
| JP | 2015-215863 A | 12/2015 |
| JP | 2016-95770 A | 5/2016 |

OTHER PUBLICATIONS

Office Action issued on Jan. 2, 2025, in corresponding Chinese Application No. 202180009677.X, 12 pages.

* cited by examiner

ABSTRACT

CONTROLLER AND CONTROLLER SYSTEM CONTROLLING TIME AND COST TO DUPLICATE A CONTROLLER

CROSS-REFERENCE TO RELATED APPLICATIONS

This application is national stage application of International Application No. PCT/JP2021/021679, filed Jun. 8, 2021, which designates the United States, incorporated herein by reference, and which claims the benefit of priority from Japanese Application No. 2020-155659, filed on Sep. 16, 2020, the entire contents of each of which are incorporated herein by reference.

FIELD

Embodiments described herein relate generally to a controller and a controller system.

BACKGROUND

A controller duplex configuration has been conventionally considered to avoid a transient breakdown in a controller system for controlling an industrial plant (hereinafter, also simply referred to as "plant"), such as a distributed control system (DCS) and a programmable logic controller (PLC).

When a controller is duplicated (standby redundancy), data that changes from moment to moment is sent from an online side (controller in operating state) to a standby side (controller in standby state) to equalize data on both sides. Moreover, a mechanism is constructed in which the states are monitored by each other and, when an abnormality occurs on the online side, the standby side is immediately promoted to the online to continue the operation.

DETAILED DESCRIPTION

A controller according to an example includes a communication port, a connection port, and a hardware processor coupled to the communication and connection ports. The communication port is configured to allow communication with another controller through a data transmission route. The connection port is to be connected to a device to be controlled and is configured to allow communication with the other controller. The hardware processor is configured to: transmit a first state signal indicating a state of the controller of an own device to the other controller from each of the communication port and the connection port; receive a second state signal indicating a state of the other controller from the other controller via each of the communication port and the connection port; and switch, in a case where the own device is in a standby state, the own device from the standby state to an operating state, when a breakdown of the other controller indicated by the received second state signal and an unreceived state in which the second state signal is not received for a predetermined time or more from both the communication port and the connection port are monitored and at least one of the breakdown and the unreceived state is detected.

Embodiments of a controller and a controller system of the present invention will be described below with reference to the drawings.

Figure 7:
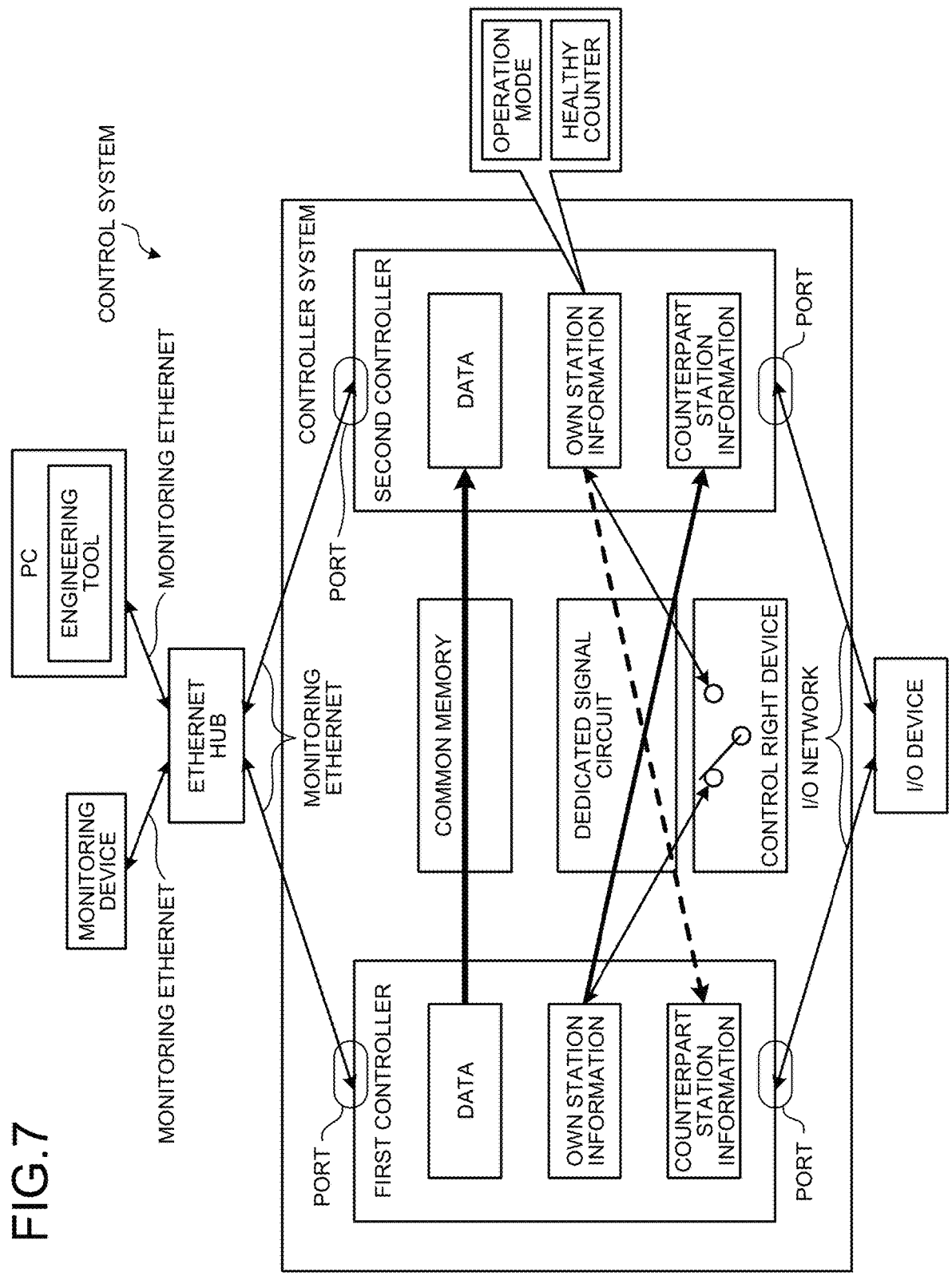
FIG. 7 schematically illustrates an overall configuration of a control system according to a comparative example.

First, a control system of a comparative example (conventional technique) will be described with reference to FIG. 7. FIG. 7 schematically illustrates the overall configuration of the control system according to an embodiment of the comparative example. The control system of the comparative example includes a controller system, a personal computer (PC), a monitoring device, an Ethernet hub (Ethernet: registered trademark), and an input/output (I/O) device.

The controller system includes a first controller (primary), a second controller (secondary), a common memory, a dedicated signal circuit, and a control right device.

The first controller and the second controller are connected to each other via the Ethernet hub, a monitoring Ethernet, and ports. Furthermore, the first controller and the second controller are connected to each other via the I/O device, an I/O network, and ports.

The first controller collects the state of a plant over the I/O network, performs various operations, and outputs the results of the operations to the plant over the I/O network and the I/O device. Furthermore, a PC includes an engineering tool for creating and setting an application program for controlling the plant. The monitoring device is a computer device for an operator to monitor the state of the plant. The PC and the monitoring device are connected to each other via the Ethernet hub and the monitoring Ethernet. The configurations connected to the Ethernet hub can communicate with each other.

The first controller and the second controller are hardware of exactly the same configuration. Usually, the first controller is in an operating state, and the second controller is in a standby state. When the first controller is stopped due to occurrence of an abnormality, the second controller is switched to the operating state.

The first controller stores data that changes from moment to moment in plant control, own station information, and counterpart station information. The own station information indicates whether the first controller itself is operating or stopped. The counterpart station information indicates whether the second controller is operating or stopped. Similarly, the second controller stores the data, own station information, and counterpart station information.

The first controller transmits data to the second controller via the common memory to equalize the data. The own station information of the first controller is transmitted via the dedicated signal circuit, and stored as the counterpart station information of the second controller. Similarly, the own station information of the second controller is transmitted via the dedicated signal circuit, and stored as counterpart station information of the first controller.

The common memory used for data transfer may be physically positioned on a chassis mounted with the first controller and the second controller, or may be in each of the first controller and the second controller. Furthermore, the data may be transferred not by a common memory method but by a method using a dedicated communication line and the like.

The own station information includes information on an operation mode and a healthy counter. The operation mode indicates the current state of the own controller (own device), and indicates states such as initialization, stop, operation, and error down (breakdown). The healthy counter is information incremented by software, and is information intended to monitor an abnormality caused by runaway of software with a counterpart controller.

The dedicated signal circuit is a hardware circuit for giving notice of the own station information, and includes a plurality of signal lines. A control right device is provided to prevent both-system online (state in which both first controller and second controller are in operating state) at the time of a breakdown of the dedicated signal circuit. The control right device is, for example, a circuit such as a flip-flop. One of the first controller and the second controller can acquire the control right. The controller having the control right can be online. In a case where the controller stops or has an error down, the controller releases the control right. The counterpart controller acquires the control right. In such a way, controllers to be online are switched.

In this way, in the comparative example, when a controller is duplicated, constructing dedicated hardware (e.g., common memory, dedicated signal circuit, and control right device) is required to equalize data and monitor the state of both the duplicated controllers, thereby unfortunately taking time and cost. Therefore, a technique capable of controlling time and cost in the case of duplicating a controller will be described below.

First Embodiment

Figure 1:
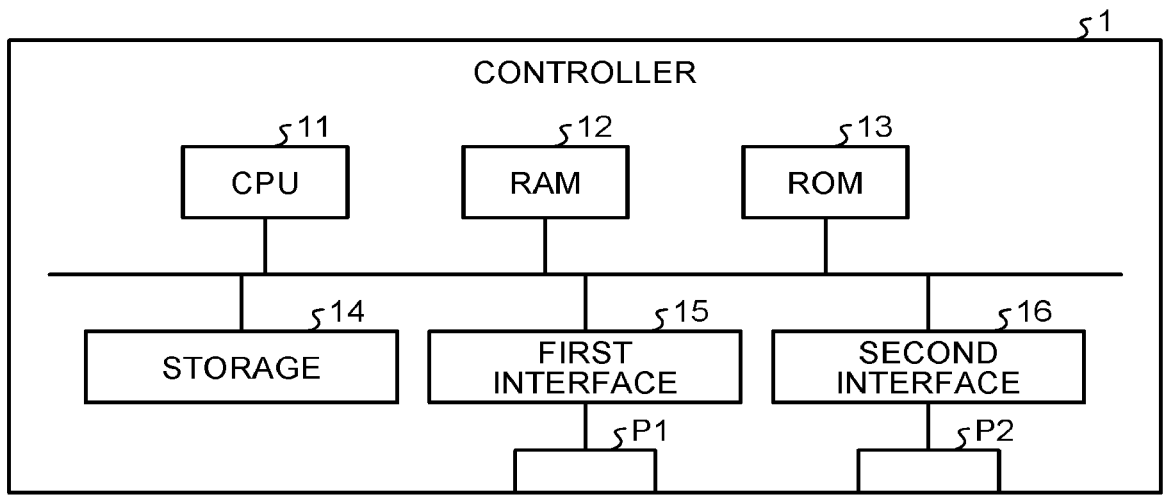
FIG. 1 is a block diagram illustrating a physical configuration of a controller according to a first embodiment.
Figure 2:
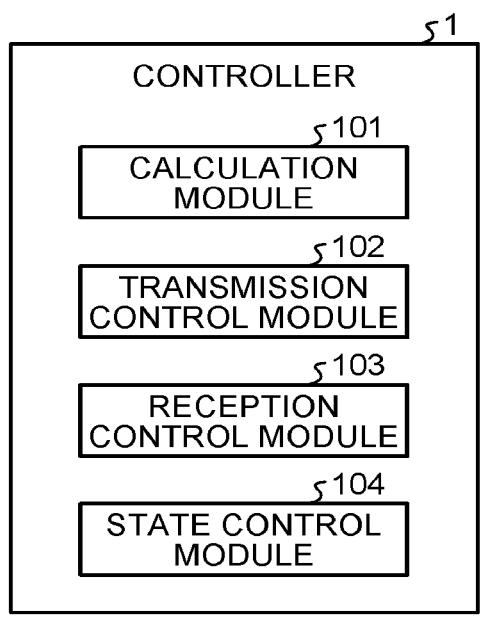
FIG. 2 is a block diagram illustrating a functional configuration of the controller according to the first embodiment.
Figure 3:
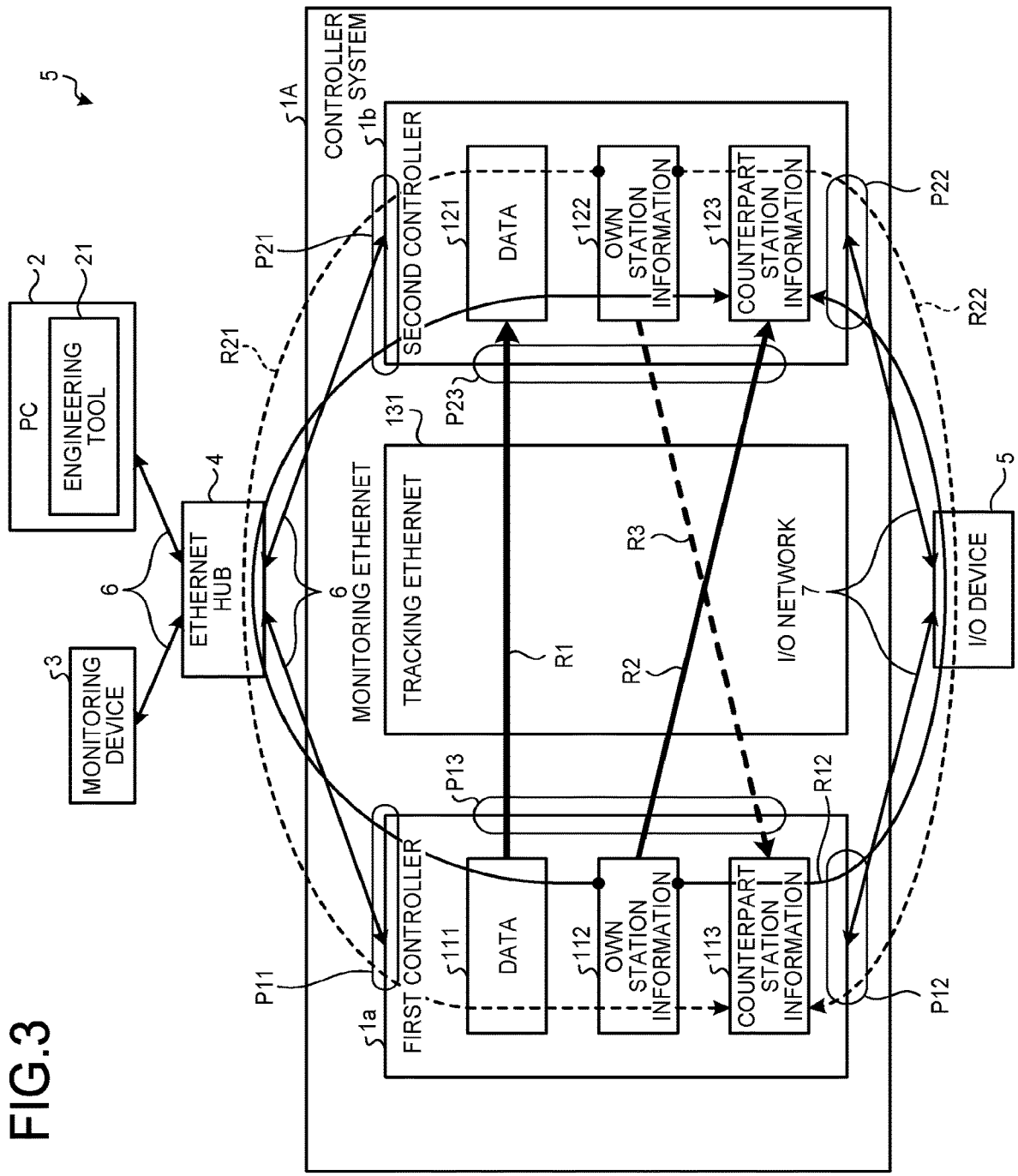
FIG. 3 schematically illustrates an overall configuration of a control system according to the first embodiment.

FIG. 1 is a block diagram illustrating the physical configuration of a controller 1 according to a first embodiment. FIG. 2 is a block diagram illustrating the functional configuration of the controller 1 according to the first embodiment. FIG. 3 schematically illustrates the overall configuration of a control system S according to the first embodiment.

The controller 1 is a device that controls a plant by controlling a device to be controlled (e.g., sensor and actuator connected to I/O device 5). Furthermore, the controller 1 can constitute a controller system with duplicated controllers with another controller.

As illustrated in FIG. 3, the control system S includes a controller system 1A, a PC 2, a monitoring device 3, an Ethernet hub 4, and the I/O device 5. The controller system 1A is obtained by duplicating a first controller 1a (controller 1) and a second controller 1b (controller 1), which control a device to be controlled.

The controllers 1 are, for example, DCS controllers, PLCs, and the like. The controllers 1 include a central processing unit (CPU) 11, a RAM 12, a ROM 13, a storage 14, a first interface 15, and a second interface 16. Furthermore, as illustrated in FIG. 3, the first controller 1a includes a port P11 (first communication port), a port P13 (first communication port), and a port P12 (first connection port). The ports P11 and P13 are Ethernet ports. The port P12 is an I/O port. The first controller 1a is connected to a monitoring Ethernet 6 via the port P11, connected to an I/O network 7 via the port P12, and connected to a tracking Ethernet 131 via the port P13.

Similarly, the second controller 1b includes a port P21 (second communication port), a port P23 (second communication port), and a port P22 (second connection port). The ports P21 and P23 are Ethernet ports. The port P22 is an I/O port. The second controller 1b is connected to the monitoring Ethernet 6 via the port P21, connected to the I/O network 7 via the port P22, and connected to the tracking Ethernet 131 via the port P23.

Returning to FIG. 1, the CPU 11 integrally controls the controller 1. The RAM 12 is a main storage device of the controller 1, and is an operation region of the CPU 11.

The ROM 13 stores various programs such as firmware executed by the CPU 11, application software, and an operating system (OS).

The storage 14 is a nonvolatile storage device, and is, for example, a solid state drive (SSD).

The first interface 15 transmits and receives information to and from the Ethernet hub 4 and the like, and is connected to a port P1. The port P1 is an example of a communication port that allows communication with another controller 1 via a data transmission route. Note that, although only one port P1 is illustrated, actually two or more ports P1 may be provided. For example, the ports P11, P13, P21, and P23 in FIG. 3 correspond to the port P1 in FIG. 1.

The second interface 16 is an I/O interface for transmitting and receiving information to and from the I/O device 5, and is connected to a port P2. The port P2 is used for connection with a device to be controlled, and an example of the connection port that allows communication with another controller 1. Note that, although only one port P2 is illustrated, actually two or more ports P2 may be provided. For example, the port P12 and the port P22 in FIG. 3, and actual data input ports (DI 114 and DI 214) and actual data output ports (DO 115 and DO 215) in FIG. 5 correspond to the port P2 in FIG. 1.

In the control system of the comparative example in FIG. 7, a common memory is used for data tracking of the first controller and the second controller, and a dedicated signal circuit is used for transferring own station information. In the control system S of the first embodiment, the tracking Ethernet 131 is used instead of those components. Data 111 of the first controller 1a is transmitted to the second controller 1b via a route R1. Furthermore, assuming a breakdown of the tracking Ethernet 131, a mechanism for transferring own station information via the monitoring Ethernet 6 and for transferring own station information via the I/O network 7 is provided.

For example, in a DCS system in which reliability is important, the monitoring Ethernet 6 and the I/O network 7 are often wired in two systems. When combined with the tracking Ethernet 131, five systems in total can transmit and receive the own station information. Then, even when one or two systems are broken down, one of the first controller 1a and the second controller 1b can monitor the state of the other without any problem. The probability that all the five systems are broken down is low, but in such a case, a counterpart system is regarded as being turned off, and an own system operates as being online. When all the five systems are broken down, both systems are online. Only one of these systems, however, can give output to the plant, and both the systems do not doubly give output. There thus arises no problem.

The controller 1 includes a calculation module 101, a transmission control module 102, a reception control module 103, and a state control module 104 as functional configurations of a module implemented by the CPU 11.

The calculation module 101 executes various calculations. For example, the calculation module 101 executes calculation processing based on various pieces of data on the plant received from the I/O device 5, and generates data (data 111 and data 121).

The transmission control module 102 executes various pieces of transmission control. The transmission control module 102 transmits a first state signal from each of the communication port and the connection port to another controller 1. The first state signal indicates the state of the first controller 1 of the own device. For example, the transmission control module 102 transmits own station information (own station information 112 and own station information 122: first state signal) to another controller 1 via a plurality of data transmission routes (tracking Ethernet 131, monitoring Ethernet 6, and I/O network 7). The own station information indicates the state of the own controller 1 (own device). Note that the other controller 1 is the second controller 1b when the own controller 1 is the first controller 1a, and is the first controller 1a when the own controller 1 is the second controller 1b.

That is, as illustrated in FIG. 3, the own station information 112 of the first controller 1a is transmitted to the second controller 1b through the three routes R2, R11, and R12. Furthermore, the own station information 122 of the second controller 1b is transmitted to the first controller 1a through the three routes R3, R21, and R22.

The reception control module 103 executes various pieces of reception control. The reception control module 103 receives a second state signal from another controller 1 via each of the communication port and the connection port. The second state signal indicates the state of the other controller 1. For example, the reception control module 103 receives own station information (own station information 112 and own station information 122: second state signal) from another controller 1 through a plurality of data transmission routes (tracking Ethernet 131, monitoring Ethernet 6, and I/O network 7). The own station information indicates the state of the other controller 1. The reception control module 103 stores the own station information as counterpart station information (counterpart station information 123 and counterpart station information 113).

The state control module 104 switches the own controller 1 from the standby state to the operating state or from the operating state to the standby state. For example. When the own controller 1 is in the standby state and counterpart station information (counterpart station information 113 and counterpart station information 123) received by the reception control module 103 indicates a breakdown of another controller 1 or the reception control module 103 does not receive the counterpart station information from both the communication port and the connection port for a predetermined time or more, the state control module 104 switches the own controller 1 from the standby state to the operating state.

The PC 2 is an information processing device including an engineering tool 21. The PC 2 includes a control device, an internal storage device, an external storage device, a display device, and an input device. The control device includes a CPU and the like. The internal storage device includes a ROM, a RAM, and the like. The external storage device includes a hard disk drive (HDD), a compact disc (CD) drive device, and the like. The display device includes a display. The input device includes a keyboard, a mouse, and the like. The PC 2 has a hardware configuration using a normal computer.

The engineering tool 21 is software (program) that manages the controller 1. In one example, the engineering tool 21 generates an application program to be executed by the controller 1, transmits the generated application program to the controller 1, and monitors processing executed by the controller 1, for example.

The monitoring device 3 is a computer device used for the operator to monitor the state of the plant.

The Ethernet hub 4 controls data communication of the first controller 1a, the second controller 1b, the PC 2, the monitoring device 3, and the like connected by the monitoring Ethernet 6.

The I/O device 5 performs input/output with a device constituting the plant. Examples of the I/O device 5 include an input device (analog input (AI) device and digital input (DI) device) and an output device (analog output (AO) device and digital output (DO) device). The input device inputs a signal from a sensor and the like installed in equipment to be controlled. The output device outputs a signal to an actuator and the like of the equipment to be controlled.

Figure 4:
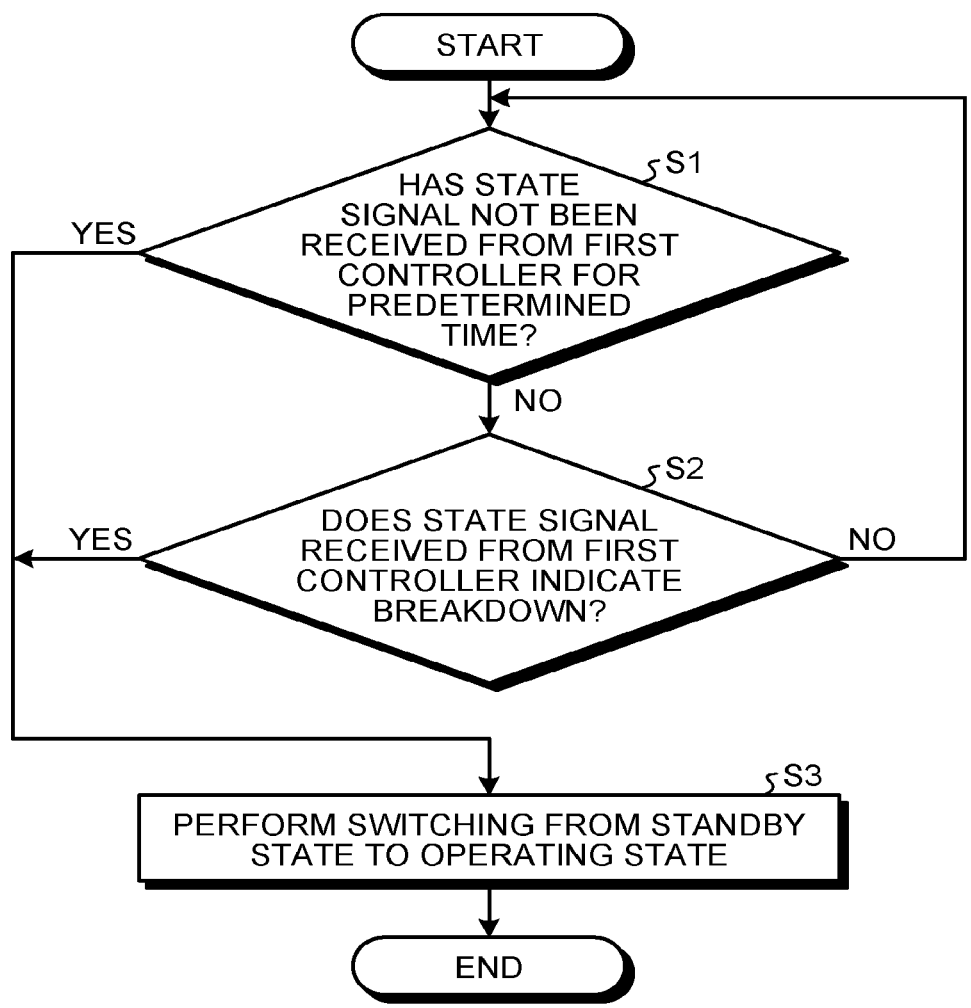
FIG. 4 is a flowchart executed by the controller in a standby state according to the first embodiment.

FIG. 4 is a flowchart executed by the controller (hereinafter, second controller 1b) in a standby state according to the first embodiment. In Step S1, the state control module 104 of the second controller 1b in the standby state determines whether the own station information 112 (state signal) has not been received from the first controller 1a for a predetermined time or more. In the case of Yes, the processing proceeds to Step S3. In the case of No, the processing proceeds to Step S2.

In Step S2, the state control module 104 of the second controller 1b determines whether or not the state signal (counterpart station information 123 (own station information 112 of first controller 1a)) received from the first controller 1a indicates a breakdown of the first controller 1a. In the case of Yes, the processing proceeds to Step S3. In the case of No, the processing returns to Step S1.

In Step S3, the state control module 104 of the second controller 1b switches the second controller 1b from the standby state to the operating state.

In this way, according to the controller system 1A of the first embodiment, the first controller 1a and the second controller 1b are connected by a plurality of data transmission routes described above, so that time and cost in the case of duplicating a controller can be controlled. That is, duplicated configuration of the controller 1 is made possible only by applying an existing function except that the tracking Ethernet 131, which is an Ethernet dedicated to tracking, is added. Thus, a duplicated system of the controller 1 in which reliability is secured at low cost can be constructed.

Furthermore, even in an existing single controller, change to the duplicated system of the controller 1 can be made only by adding the tracking Ethernet 131 or modifying firmware of the controller 1 without changing versions of hardware by applying the monitoring Ethernet 6. In the controller 1 to which a recent computer architecture is applied, there may be redundant Ethernet ports (e.g., ports P11 and P13 in first controller 1a). In that case, the duplicated system of the controller 1 can be constructed without changing hardware at all.

In the technique of the comparative example (FIG. 7), when information of a counterpart controller cannot be correctly read due to a factor such as a hardware breakdown, there is a risk that a control right cannot be acquired and incompatibility such as stop of both systems occurs. In contrast, in the controller system 1A of the present embodiment, duplicated management can be performed by confirming an abnormal state of the counterpart controller 1 with high reliability with a redundant signal.

Second Embodiment

Figure 5:
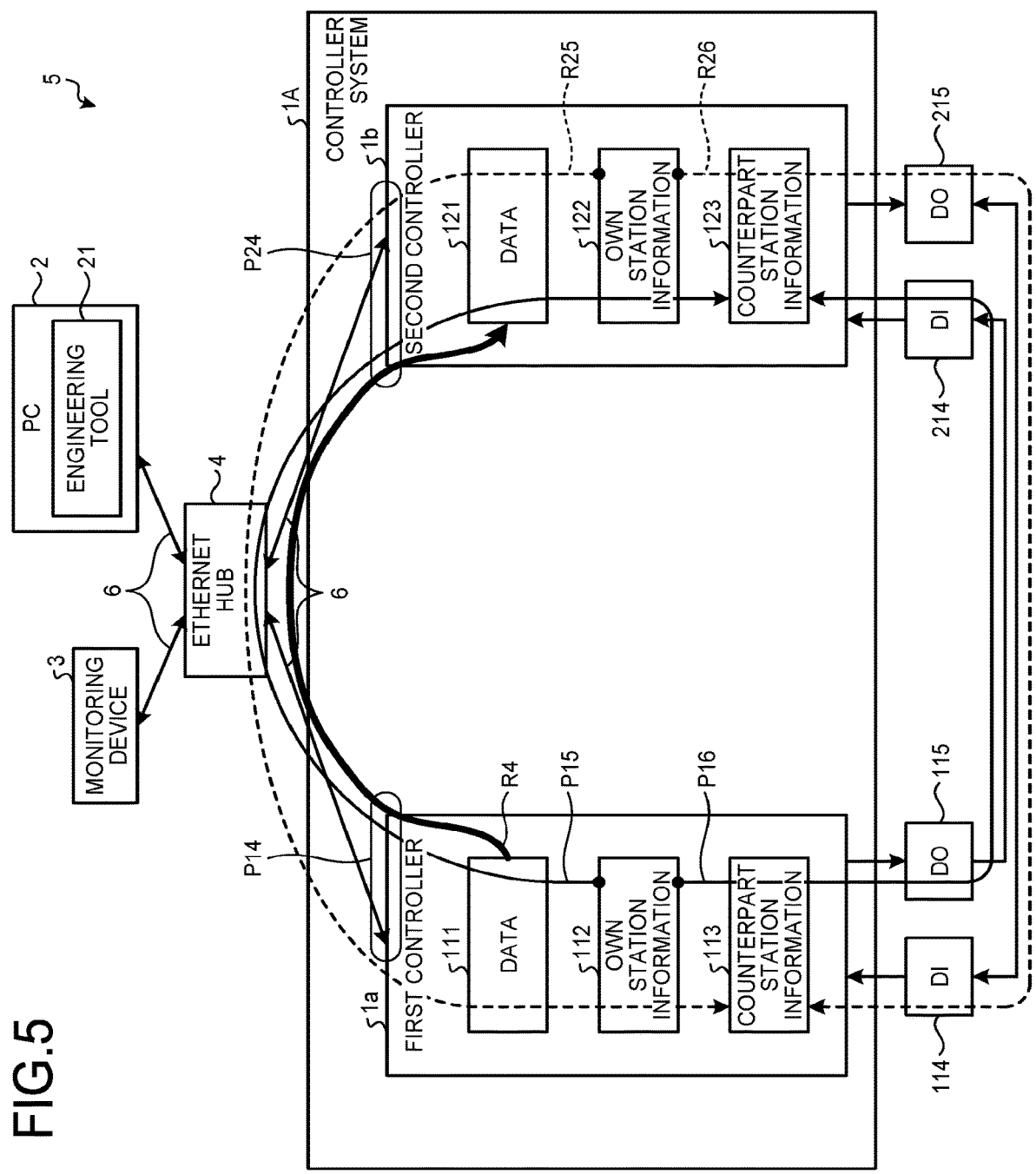
FIG. 5 schematically illustrates an overall configuration of a control system according to a second embodiment.

Next, a second embodiment will be described. Description of matters similar to those in the first embodiment will be appropriately omitted. FIG. 5 schematically illustrates the overall configuration of the control system S according to the second embodiment. In the second embodiment, each of the first controller 1a and the second controller 1b includes one communication port (ports P14 and P24), one or more actual data input ports (first actual data input port (DI 114) and second actual data input port (DI 214)), and one or more actual data output ports (first actual data output port (DO 115) and second actual data output port (DO 215)).

Furthermore, the first controller 1a and the second controller 1b are connected to each other by a first data transmission route (monitoring Ethernet 6) using a communication port (ports P14 and P24). Furthermore, the actual data input port (DI 114) of the first controller 1a and the actual data output port (DO 215) of the second controller 1b are connected to each other by one data transmission route. Furthermore, the actual data output port (DO 115) of the first controller 1a and the actual data input port (DI 214) of the second controller 1b are connected to each other by a second data transmission route. Then, the first controller 1a transmits a signal of a state of the first controller 1a itself (own station information 112) to the second controller 1b through the first data transmission route and the second data transmission route. Specific description will be given below.

In a small-scale control system S, the monitoring Ethernet 6 is a single (wiring of one system), and transmission of the own station information 112 and the own station information 122 via the monitoring Ethernet 6 can be performed by only one system. Furthermore, there is no hardware resources to which the tracking Ethernet can be added. That is, the controller 1 (first controller 1a and second controller 1b) has no redundant Ethernet port.

Furthermore, an I/O function of direct digital input (DI) and digital output (DO) is given, so that information cannot be transmitted by communication. A small amount of handled data (data 111 and data 121) and a small communication amount of the monitoring Ethernet 6 in such a control system S allows the monitoring Ethernet 6 to be used for tracking the data (data 111 and data 121). Only one system of the monitoring Ethernet 6, however, transmits the own station information 112 and the own station information 122, which lowers reliability.

Therefore, the DO 115 of the first controller 1a and the DI 214 of the second controller 1b are connected to each other to transmit pulse data from the first controller 1a to the second controller 1b. Similarly, the DO 215 of the second controller 1b and the DI 114 of the first controller 1a are connected to each other to transmit pulse data from the second controller 1b to the first controller 1a. This configuration allows notification of the own station information 112 and the own station information 122 on operation/stop via the I/O. Note that notification of the contents corresponding to the operation mode (state of controller 1) can be made by using not simple pulse data but pulse data with a changed frequency and pattern.

In this way, the own station information 112 of the first controller 1a is transmitted to the second controller 1b through two routes R15 and R16. Furthermore, the own station information 122 of the second controller 1b is transmitted to the first controller 1a through two routes R25 and R26. Furthermore, data 111 of the first controller 1a is transmitted to the second controller 1b via a route R4.

This allows transmission routes of two systems of the own station information 112 and the own station information 122 to be secured, and allows the transmission routes to function as duplicated systems of the controller 1. Note that, when an abnormality occurs in both the monitoring Ethernet 6 and an I/O-side transmission route, monitoring and control are stopped similarly to the five-system breakdown in a large-scale system (control system S in first embodiment). Although both the systems continue to operate to be online, only one of these systems can give output to the plant, and both the systems do not doubly give output. There thus arises no problem.

Third Embodiment

Figure 6:
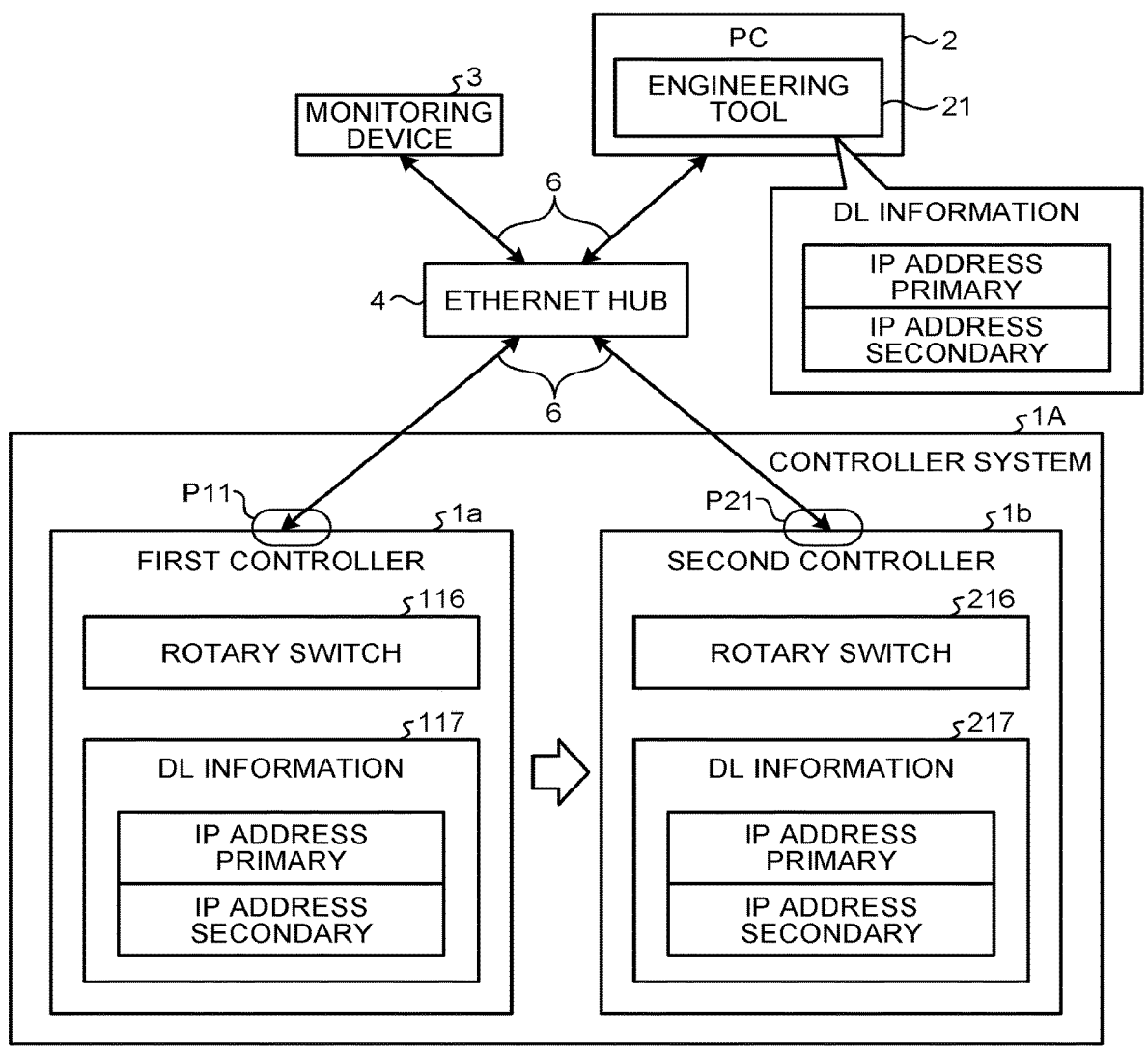
FIG. 6 schematically illustrates an overall configuration of a control system according to a third embodiment.

FIG. 6 schematically illustrates the overall configuration of the control system S according to a third embodiment. Description of matters similar to those in the first embodiment will be appropriately omitted. The first controller 1a is also hereinafter referred to as a primary. The primary indicates a physical position (priority side) of double redundancy. Furthermore, the second controller 1b is also referred to as a secondary. The secondary indicates a physical position (subordinate side) of the double redundancy. When the controller system 1A is turned on, the primary preferentially starts up. The primary is brought into an online state, and the secondary is brought into a standby state.

Furthermore, each of the first controller 1a and the second controller 1b determines whether the own controller 1 is in the operating state or in the standby state based on an internet protocol (IP) address of the controller 1 to be in the operating state (IP address primary), an IP address of the controller 1 to be in the standby state (IP address secondary), and settings made by an own rotary switch (rotary switches 116 and 216). Download (DL) information from the PC 2 (upper-level device) includes the IP address primary and the IP address secondary. Specific description will be given below.

As described above, the controller 1 has the primary and the secondary depending on a mounted position. The controller 1 cannot identify whether the controller 1 itself is the primary or the secondary in a memory clear state.

The first controller 1a and the second controller 1b include the rotary switches 116 and 216 for setting an IP address of the monitoring Ethernet 6, respectively. The rotary switches 116 and 216 are essential for performing communication through the monitoring Ethernet 6, and exist regardless of a duplicating function.

DL information includes the IP address primary and the IP address secondary. In the DL information, a user makes various settings for the controller 1 in the engineering tool 21 of the PC 2. For example, the IP address primary is registered as "172.16.64.01", and the IP address secondary is registered as "172.16.64.02".

Furthermore, the user sets the rotary switches 116 and 216 of the first controller 1a and the second controller 1b to be used. For example, the rotary switch 116 of the first controller 1a is set to "01h", and the rotary switch 216 of the second controller 1b is set to "02h".

Furthermore, the engineering tool 21 of the PC 2 downloads the DL information to the first controller 1a (IP address=172.16.64.01) serving as the primary. Although the first controller 1a does not recognize the first controller 1a itself as the primary, the DL information is stored in the first controller 1a since the DL information is downloaded from the engineering tool 21 with the IP address.

After storing DL information 117, the first controller 1a compares the IP address primary (172.16.64.01) and the IP address secondary (172.16.64.02) of the DL information 117 with the setting (01h) of the rotary switch 116. In this case, the setting of the rotary switch 116 is "01h", and the first controller 1a determines the first controller 1a itself as the primary. That is, the PC 2 is brought into the operating state in response to a request from the engineering tool 21.

Then, the engineering tool 21 of the PC 2 requests to execute the second controller 1b. Specifically, since the first controller 1a is in the operating state and the second controller 1b is in the memory clear state, the DL information is transmitted from the first controller 1a to the second controller 1b to equalize the DL information.

Then, the IP address information is also reflected in DL information 217 of the second controller 1b. The second controller 1b compares the IP address primary (172.16.64.01) and the IP address secondary (172.16.64.02) of the DL information 217 with the setting (02h) of the rotary switch 216. In this case, the setting of the rotary switch 216 is "02h", and the second controller 1b determines the second controller 1b itself as the secondary.

In this way, each controller 1 can identify the controller 1 itself as which of the primary or secondary only by the DL information from the engineering tool 21 of the PC 2 and the settings of the rotary switches 116 and 216 of the first controller 1a and the second controller 1b.

A program executed by the controller 1 of each of the above-described embodiments is provided by being recorded in a computer-readable recording medium, such as a CD-ROM, a flexible disk (FD), a CD-R, and a digital versatile disk (DVD), in a file of an installable format or an executable format.

Furthermore, the program may be provided by being stored on a computer connected to a network such as the Internet and downloaded via the network. Furthermore, the program may be provided or distributed via the network such as the Internet. Furthermore, the program may be provided by being preliminarily incorporated in a ROM or the like.

The program executed by the controller 1 of each of the above-described embodiments has a module configuration that implements each of the above-described functions. As actual hardware, a CPU (processor) reads the program from the above-described storage medium and executes the program. Each functional unit is thereby loaded on a main storage device to implement each function.

Although some embodiments of the present invention have been described, these embodiments have been presented as examples, and are not intended to limit the scope of the invention. These novel embodiments can be implemented in various other forms. Various omissions, substitutions, and changes can be made without departing from the gist of the invention. These embodiments and variations thereof are included in the scope and gist of the invention while included in the invention described in the claims and the equivalent scope thereof.

The invention claimed is:

1. A controller system comprising a first controller and a second controller, the first controller comprising:

a first communication port configured to allow communication with the second controller through a data transmission route; and a first connection port to be connected to a device to be controlled, the first connection port being configured to allow communication with the second controller, the second controller comprising:

a second communication port configured to allow communication with the first controller through the data transmission route; and a second connection port to be connected to the device to be controlled, the second connection port being configured to allow communication with the first controller; and a hardware processor coupled to the second communication and connection ports and configured to switch, in a case where the first controller is in an operating state and the second controller is in a standby state, the second controller from the standby state to the operating state when a state signal indicating a breakdown from the first controller is received from one of the second communication port and the second connection port or when a state signal from the first controller has not been received for a predetermined time or more from both the second communication port and the second connection port;

wherein the first controller includes a first actual data input port and a first actual data output port as the first connection port, the second controller includes a second actual data input port and a second actual data output port as the second connection port, the first actual data input port of the first controller and the second actual data output port of the second controller are connected by a first transmission route, the first actual data output port of the first controller and the second actual data input port of the second controller are connected by a second transmission route, and the hardware processor of the second controller is configured to switch, in a case where the first controller is in the operating state and the second controller is in the standby state, the second controller from the standby state to the operating state when the state signal indicating a breakdown from the first controller is received from one of the second communication port and the second actual data input port or when the state signal from the first controller has not been received for a predetermined time or more from both the second communication port and the second actual data input port.

2. The controller system according to claim 1, wherein each of the first controller and the second controller determines whether an own device thereof is in an operating state or in a standby state based on an internet protocol (IP) address of a controller to be in the operating state and an IP address of a controller to be in the standby state, which are included in download information from an upper-level device, and a setting made by a rotary switch of the own device.

* * * * *